United States Patent [19]

Raynham

[11] 4,146,743
[45] Mar. 27, 1979

[54] ADAPTIVE SAMPLING DECODER-ENCODER APPARATUS AND METHOD

[75] Inventor: Michael B. Raynham, Saratoga, Calif.

[73] Assignee: Hewlett-Packard Company, Palo Alto, Calif.

[21] Appl. No.: 713,004

[22] Filed: Aug. 9, 1976

[51] Int. Cl.² .................. H03K 13/24; H04L 3/00
[52] U.S. Cl. ............................ 178/69.1; 360/51; 340/347 DD
[58] Field of Search ............ 340/347 DD; 179/15 BS, 179/15 BV; 328/55, 63, 71, 72, 73; 329/50, 122; 332/11 D; 360/26, 27, 28, 32, 39, 51; 178/69.1, 68, 66 R

[56] References Cited

U.S. PATENT DOCUMENTS

| | | | |
|---|---|---|---|
| 3,921,213 | 11/1975 | McGrath | 360/51 |
| 3,944,940 | 3/1976 | Desai | 329/122 |
| 4,009,490 | 2/1977 | Fassbender | 360/51 |
| 4,023,116 | 5/1977 | Alfke et al. | 325/421 |

*Primary Examiner*—Benedict V. Safourek
*Attorney, Agent, or Firm*—A. C. Smith

[57] ABSTRACT

A decoder-encoder with a biphase or delta-distance to binary decoding circuit adapts the data sampling interval to compensate for a non-centered signal level transition in the preceding sample interval. The location of the signal level transition in the prior sampling interval modifies the location of the subsequent sampling interval. The adaptive sampling maintains relative frequency and phase synchronization between the biphase or delta-distance source and the decoding circuit.

8 Claims, 5 Drawing Figures

ADAPTIVE SAMPLING DECODER-ENCODER APPARATUS AND METHOD

BACKGROUND OF THE INVENTION

Certain data encoding techniques have been developed for writing binary information on magnetic tape. Biphase encoding creates at least one flux reversal for each bit cell and is inherently self-clocking. However, biphase encoding is susceptible to phase-error bit shifting due to high- or low-frequency phase shifts when decoding.

SUMMARY OF THE INVENTION

Accordingly, during decoding, the present invention monitors the frequency and phase of the input signal by sensing when a previous signal level transition occurred within the sampling interval. The sampling of an input signal with a frequency related phase shift is then compensated by changing the location of subsequent sampling intervals.

The invention is particularly useful for a biphase decoder-encoder for translating digital information to and from a magnetic tape system. The invention is also useful for translating other code such as delta-distance code. The adaptive sampling means contained therein is generally applicable to the sampling of data signals which occur at discrete time intervals and are subject to frequency related phase shift errors. Broadly, the invention describes a means of changing the sampling interval in response to the occurrence of a previous data signal that is not centered within the sampling interval.

DESCRIPTION OF THE PREFERRED EMBODIMENT

Figure 1:
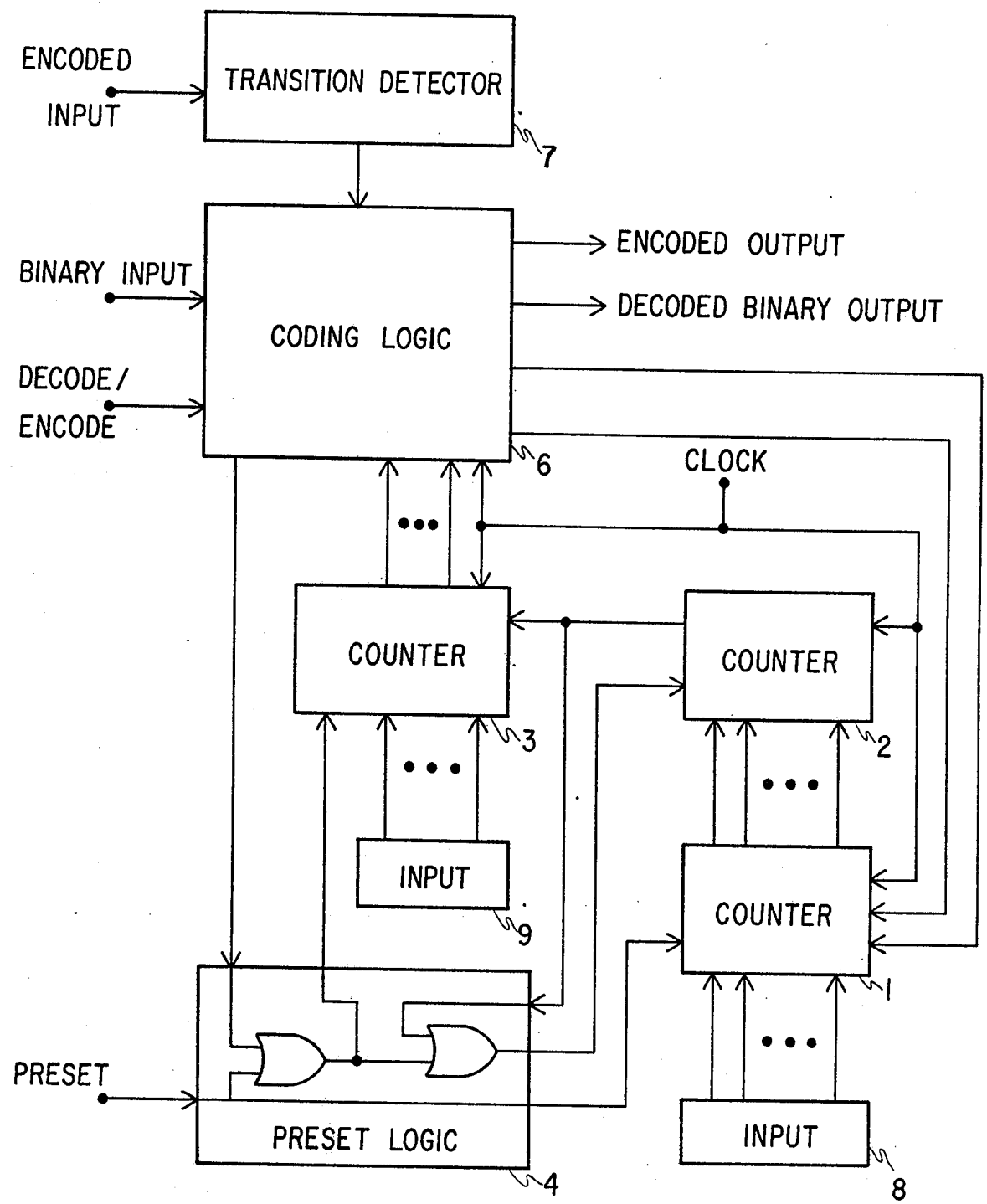
FIG. 1 is a simplified schematic diagram of the adaptive sampling decoder-encoder of the present invention.

Referring to FIG. 1, there is shown a counter 1 preset by a preset signal from the preset logic 4 with a plurality of inputs, such as from a constant input state 8. Input state 8 contains the nominal modulus of counter 2 which may be stored as a negative value in two's complement representation. The value of the nominal modulus is a function of the data record density of the magnetic tape and the speed at which the tape is read, or ultimately the data transmission rate, as well as an applied clock frequency. The nominal modulus, stored in negative two's complement representation, allows counter 2, when preset to this value, to be incremented to its overflow state by an applied clock signal in the modulo number of periods.

When encoding binary input data, the representation of the nominal modulus of counter 2 is preset into counter 1 and may be stored in counter 1 as the binary input is coded into the encoded output. When decoding encoded input data, the representation of the nominal modulus of counter 2 is preset into counter 1; counter 1 may then be incremented or decremented by one counter state (unary modulus incrementing or decrementing) for each signal level transition of the encoded input as the encoded input is decoded into the binary output.

Counter 2 operates in conjunction with counter 1 as a variable modulus counter, and may be preset with a preset signal from the preset logic 4 with the representation of its modulus stored in counter 1. Counter 2 may then be incremented one state at a time through a sequence of counter states (unary state sequencing) by a clock signal applied to a control input. When counter 2 counts to a predetermined counter state, such as its overflow state, it generates an output signal, such as a carry signal. The carry signal from counter 2 then causes the preset logic 4 to once again preset counter 2 with the representation of its modulus stored in counter 1. The object is to generate a recurring signal with a controllably variable period, wherein the period is regulated by varying the modulus of a counter receiving a constant frequency input.

Counter 3 is a constant modulus counter that may be preset by a preset signal from the preset logic 4 to a predefined state determined by a plurality of inputs, such as from a constant input state 9. The state of counter 3 is sequentially changed, such as by incrementing counter 3 with the carry output of counter 2.

Figure 2A:
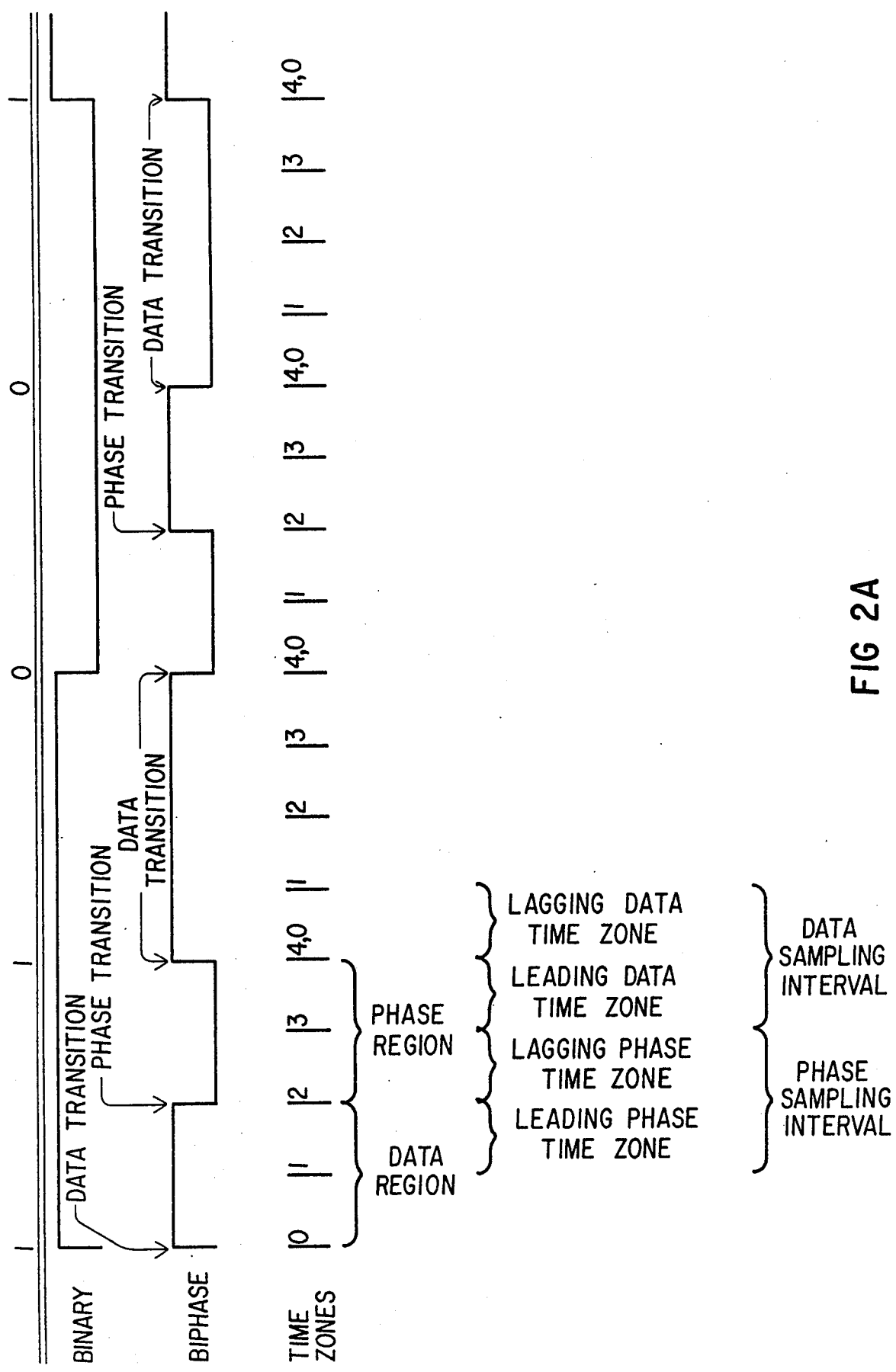
FIGS. 2a and 2b are waveform diagrams for illustrating the operating embodiment of the present invention.
Figure 2B:
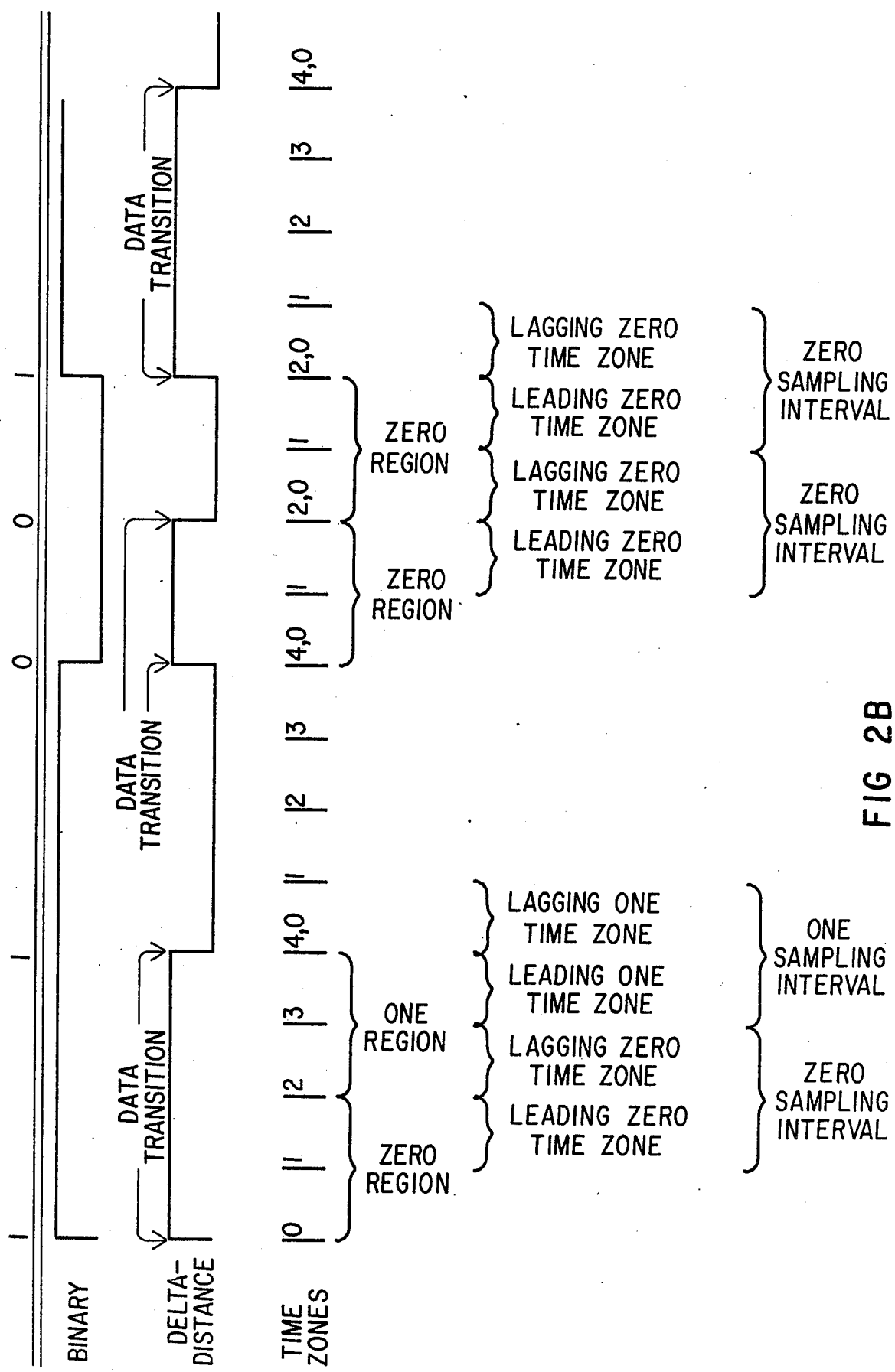

The coding logic 6 decodes the output state of counter 3 into a sequence of time zones and sampling intervals, such as those shown in FIGS. 2a and 2b. Referring to FIGS. 2a and 2b for the timing of the coding logic 6, an example of binary code and corresponding biphase and delta-distance codes are shown. Basically, the biphase code indicates the logic state by the direction of the signal level transition at the beginning of each data cell, wherein a data cell is the duration of one bit of code. If sequential data cells have the same logic state, an additional signal level transition, a phase transition, is created in the middle of the preceding data cell to allow for the proper signal level transition at the beginning of the next data cell. For example, a biphase code may be defined as shown in FIG. 2a where a logical one is denoted by a positive directed transition and a logical zero by a negative directed transition. Delta-distance code indicates the logic state by the time duration between alternating signal level transitions. For example, a delta-distance code may be defined as shown in FIG. 2b where a logical one is denoted by a pulse duration twice as long as the pulse duration which corresponds to a logical zero.

Figure 3:
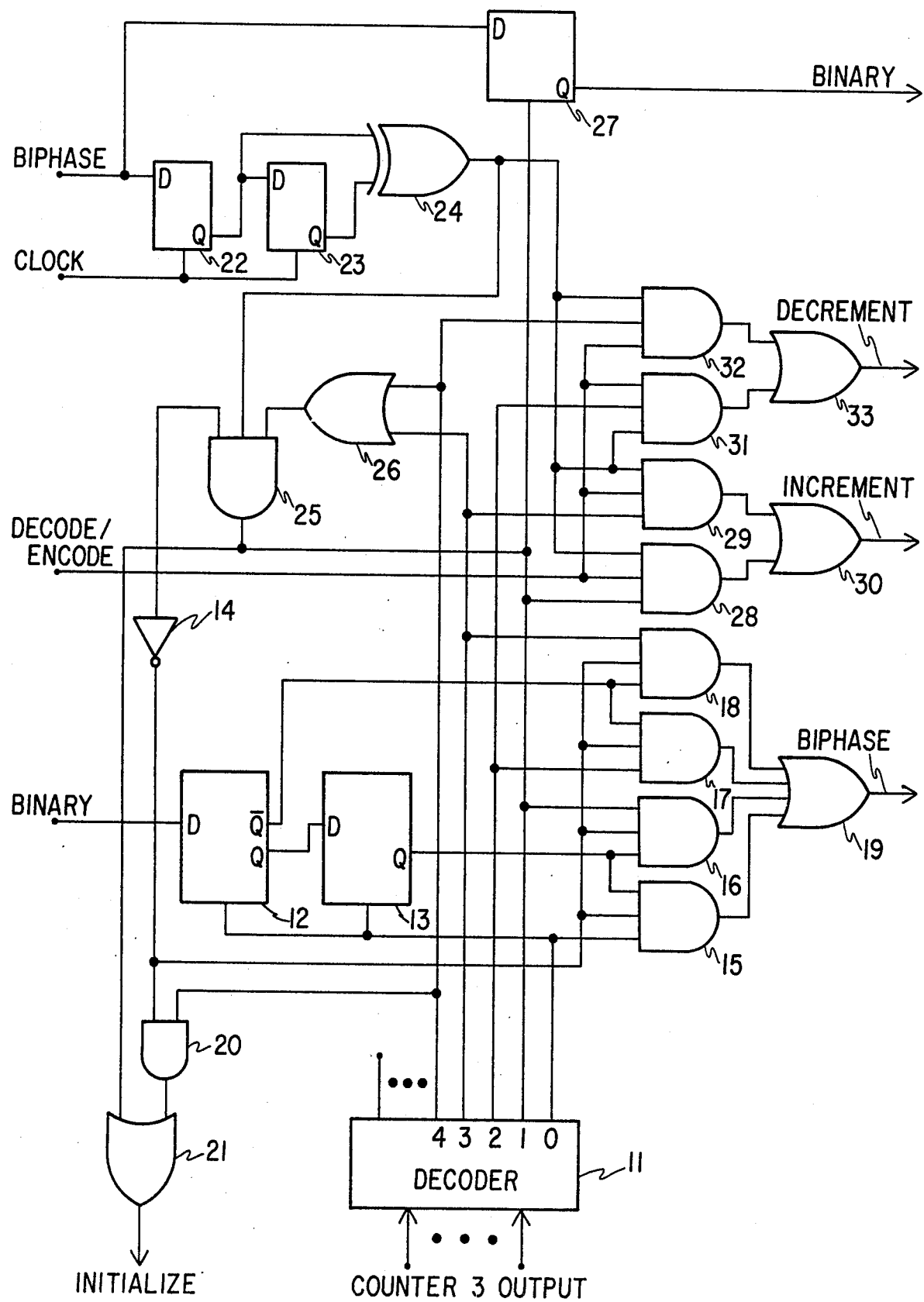
FIG. 3 is a detailed schematic diagram of a coding logic for a biphase to binary decoder-encoder.
Figure 4:
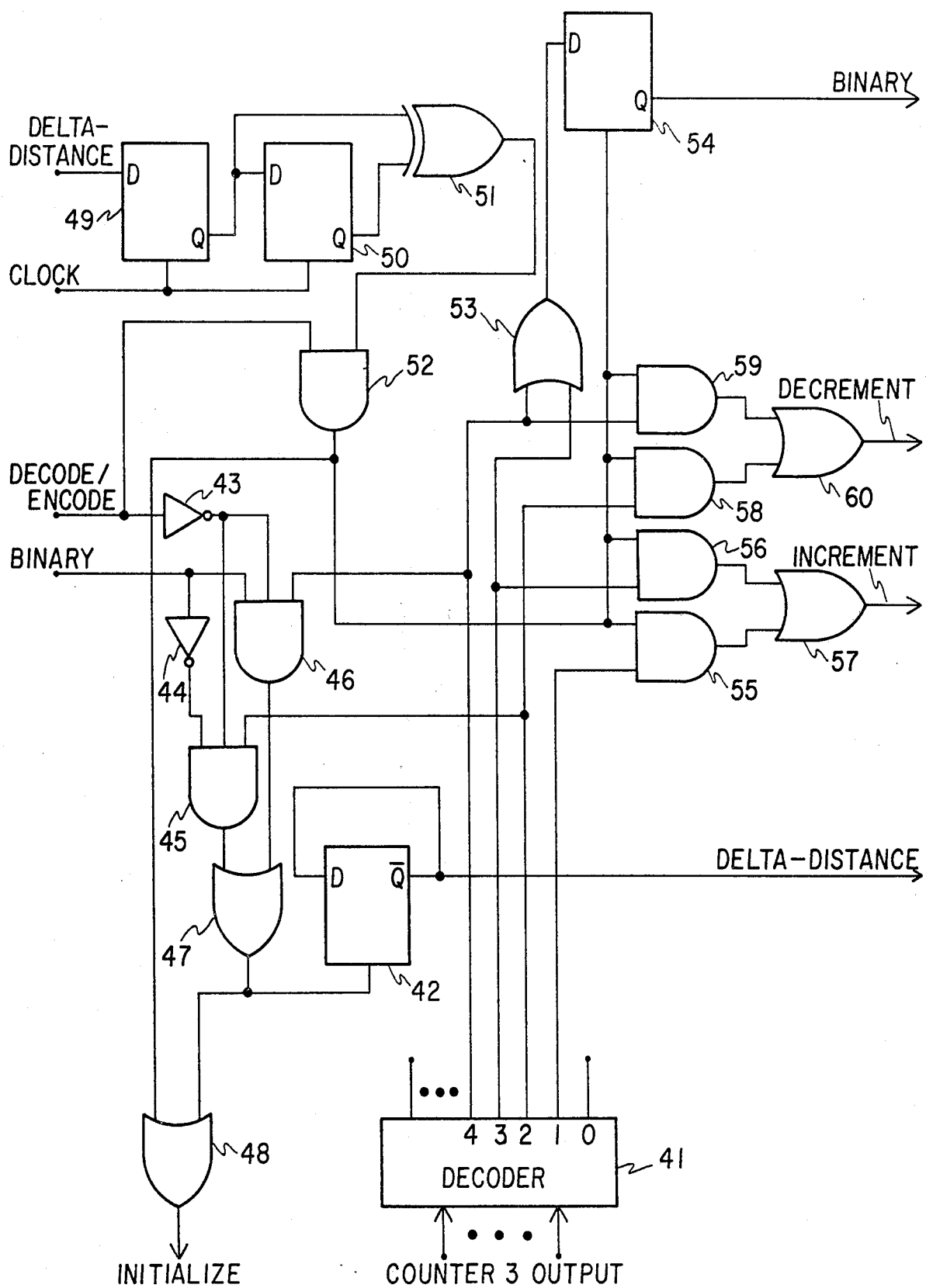
FIG. 4 is a detailed schematic diagram of a coding logic for a delta-distance to binary decoder-encoder.

Referring to FIGS. 3 and 4, the time zones may be generated by decoding the output of counter 3 such as with decoders 11 and 41. Decoders 11 and 41 may generate a signal at a unique output for each time zone corresponding to an output state of counter 3.

A binary to biphase coding may be generated using the coding logic 6 as shown in FIG. 3 by applying a binary input signal and a decode/encode signal, such as a logical zero to signify an encode operation, in conjunction with the decoder-encoder of FIG. 1. To encode binary input data into biphase encoded output, the coding logic may use the decoded time zone corresponding to state 0 of counter 3 (hereinafter referred to only by state number) to clock the binary data into D type flip-flop 12 and the following state 0 to clock the Q output of flip-flop 12 into D type flip-flop 13. The decode/encode signal may be used to enable the biphase output by inverting the decode/encode signal, such as with invertor 14, and connecting the inverse of the decode/encode signal to AND gates 15–18. The AND gates 15–18 may be further enabled by the unique outputs from decoder 11 which correspond to states 0 through 3. Thus, during state 0, AND gate 15 will be fully enabled and during state 1, AND gate 16 will be fully enabled; when enabled, AND gates 15 and 16 will generate the logical equivalent of the Q output of flip-flop 13. During state 2, AND gate 17 will be fully enabled and during state 3, AND gate 18 will be fully enabled; when enabled, AND gates 17 and 18 will generate the logical equivalent of the $\overline{Q}$ output of flip-flop 12. The outputs of the sequentially enabled AND gates 15–18 are connected to the inputs of OR gate 19 to generate the encoded biphase output. An initialize signal may be generated through OR gate 21 by AND gate 20 which receives inputs from the inverse of the decode/encode signal and state 4.

A biphase to binary coding may be generated using the coding logic 6 as shown in FIG. 3 by applying a biphase signal from the transition detector 7 and a decode/encode signal, such as a logical one to signify a decode operation, in conjunction with the decoder-encoder of FIG. 1. To decode biphase to binary, the coding logic may use the applied clock to clock the biphase data into D type flip-flop 22 and to clock the Q output of flip-flop 22 into D type flip-flop 23 on the following clock period. A logic level transition may be detected by the exclusive-OR gate 24. When a transition occurs in states 3 or 4 it is a data transition. Thus, when enabled by a decode/encode signal, the output of gate 24 and the output of OR gate 26, AND gate 25 will generate an output signal. The output of gate 25 may be used to initialize the preset logic 4 through gate 21 and to clock the logic level of the biphase signal into D type flip-flop 27. Flip-flop 27 may then generate the decoded binary signal from the Q output. Additionally, the output of gate 24 may be used to generate increment and decrement signals to counter 1 with gates 28–33 when enabled by the decode/encode signal. An increment signal may be generated when a transition occurs either during state 1 or 3, such as from OR gate 30 receiving an input from AND gates 28 or 29. A decrement signal may be generated when a transition occurs either during state 2 or 4, such as from OR gate 33 receiving an input from AND gates 31 or 32.

A binary to delta-distance coding may be generated using the coding logic 6 as shown in FIG. 4 by applying a binary signal and a decode/encode signal, such as a logical zero to signify an encode, in conjunction with the decoder-encoder of FIG. 1. To encode binary into delta-distance, the coding logic may use a D type flip-flop 42 having the D input connected to the $\overline{Q}$ output to operate in a toggle-mode on a clock input. Flip-flop 42 may then generate the delta-distance code from the $\overline{Q}$ output. The decode/encode signal may be used to enable the clocking of flip-flop 42 by inverting the decode/encode signal, such as with invertor 43, and connecting the inverse of the decode/encode signal to AND gates 45 and 46. The clock input of flip-flop 42 causes the flip-flop to toggle whenever a clock signal occurs, which occurs when either a binary zero input occurs at state 2 or a binary one input occurs at state 4 in conjunction with the decode/encode signal. This may be implemented by inverting the binary input, such as with invertor 44, connecting the inverted binary input along with state 2 and the inverted decode/encode signal to the inputs of AND gate 45, and connecting the binary input along with state 4 and the inverted decode/encode signal to the inputs of AND gate 46. The outputs of AND gates 45 and 46 may then be combined by OR gate 47 which generates the clock signal for flip-flop 42 and the initialize signal for the preset logic 4 through OR gate 48.

A delta-distance to binary coding may be generated using the coding logic 6 as shown in FIG. 4 by applying a delta-distance signal and a decode/encode signal, such as a logical one to signify a decode in conjunction with the decoder-encoder of FIG. 1. To decode delta-distance into binary, the coding logic may use the applied clock to clock the delta-distance data into D type flip-flop 49 and to clock the Q output of flip-flop 49 into D type flip-flop 50 on the following clock period. A logic level transition may be detected by the exclusive-OR gate 51. When enabled by a decode/encode signal, the AND gate 52 may be used to generate an initialize signal for the preset logic 4 through gate 48 and a clock signal for D type flip-flop 54. States 3 and 4 are combined by OR gate 53 to furnish the D input to flip-flop 54 which generates the decoded binary from the Q output of flip-flop 54. An increment signal is generated when a transition occurs either during state 1 or 3, such as from OR gate 57 receiving an input from AND gates 55 and 56. A decrement signal is generated when a transition occurs either during state 2 or 4, such as from OR gate 60 receiving an input from AND gates 58 or 59.

Summarizing, when encoding, the time zones distinguish data and phase regions for biphase encoding within each data cell, wherein a data cell is the duration of one bit of code. Delta-distance encoding, however, has no phase regions and the time zones define only the cell boundary. The coding logic 6 encodes the binary input with the time zones and generates the encoded output.

The initialize signal which is generated for the preset logic 4 denotes the end of a data cell and causes the preset logic 4 to preset counters 2 and 3, thereby initiating a new data cell.

When decoding, the coding logic 6 may utilize the time zones as leading and lagging time zones either within data and phase sampling intervals for biphase decoding or one and zero sampling intervals for delta-distance decoding. A signal level transition at the encoded input is sensed by the transition detector 7. The coding logic 6 acts as a sample gate to decode the encoded input from the output of the transition detector 7 using the time zones as sampling control signals to define sampling intervals. Using a means, such as described previously in FIGS. 3 and 4 and the accompanying description, coding logic 6 generates the decoded binary output as its sampled data output. The coding logic 6 further acts as a comparator, such as a greater-than-or-less-than comparator, to determine the relative occurrence of a transition within the sampling interval, such as whether the transition occurred within the first half (leading half) or second half (lagging half) of the sampling interval. The coding logic 6 then generates an output indicating when the transition occurred for varying the counter modulus, such as by incrementing or decrementing the modulus.

For example the following occurrences may elicit the corresponding responses.

When a phase transition occurs in a leading phase time zone, counter 1 is incremented. This decreases the effective modulus of counter 2 and decreases the duration of the subsequent time zones. The effect tends to center the data sampling interval about the following data transition if the displacement is the result of a frequency related phase shift and the frequency of the phase shift is much less than the sampling frequency.

When a phase transition occurs in a lagging phase time zone, counter 1 is decremented. This increases the effective modulus of counter 2 and increases the duration of the subsequent time zones. The effect tends to center the data sampling interval about the following data transition if the displacement is the result of a frequency related phase shift and the frequency of the phase shift is much less than the sampling frequency.

When a data transition occurs in a leading data time zone, counter 1 is incremented and the preset logic 4 presets counters 2 and 3. The effect of incrementing counter 1 is the same as previously described. The coding logic 6 generates the corresponding decoded binary output from the encoded input.

When a data transition occurs in a lagging data time zone, counter 1 is decremented and the preset logic 4 presets counters 2 and 3. The effect of decrementing counter 1 is the same as previously described. The coding logic 6 generates the corresponding decoded binary output from the encoded input.

I claim:

1. An adaptive sampling means comprising:
   data detection means having an input connected to receive an applied data signal and including a sample gate having a sampling interval which is controlled by a sampling control signal applied thereto for generating a sampled data output in response to transitions in logic states of the applied data signal;
   comparator means having an input connected to receive the sampled data output and having another input connected to receive the sampling control signal for generating an output which is indicative of a previous applied data signal appearing either prior to or after a reference instant within the sampling interval;
   counting means having a control input connected to receive the comparator output for varying the counter modulus, and having another input connected to receive an applied clock signal for sequentially changing the counter state and generating an output in response to the occurrence of a predetermined counter state, the counter means being responsive to the comparator output for either decrementing the counter modulus when the received comparator output indicates a previous applied data signal occurred prior to the reference instant within the sampling interval, or incrementing the counter modulus when the received comparator output indicates a previous applied data signal occurred after the reference instant within the sampling interval; and
   sampling control means having an input connected to the output of the counter for applying a sampling control signal to said data detection means and said comparator means for varying a subsequent sampling interval.

2. An adaptive sampling decoding-encoding means comprising:
   variable modulus counting means having a preset input connected to receive a first preset signal for presetting the variable modulus counting means to a state determined by a plurality of applied inputs, and having another control input connected to receive a modulus control signal for varying the modulus of the variable modulus counting means, and having another input connected to receive an applied clock signal for sequentially changing the state of the variable modulus counting means, and generating an output in response to the occurrence of a predetermined state of the variable modulus counting means;
   constant modulus counting means having a preset input connected to receive a second preset signal for presetting the constant modulus counting means to a predefined state, and having another input connected to receive the output of the variable modulus counting means for sequentially changing the state of the constant modulus counting means and generating a plurality of outputs representing the state of the constant modulus counting means;
   transition detection means having an input connected to receive an applied encoded signal for sensing signal level transitions in the applied encoded signal and generating an output representing the occurrence of a transition in the applied encoded signal;
   decoding-encoding means having a plurality of inputs connected to receive the outputs of the constant modulus counting means, the output of the transition detection means, the applied binary signal and the applied decode/encode control signal, and generating a decoded binary output in response to the gated inputs from the constant modulus counting means, the transition detection means and the applied decode/encode control signal, generating an encoded output in response to the gated inputs from the constant modulus counting means, the applied binary signal and the applied decode/encode control signal, generating a modulus control signal in response to the gated inputs from the constant modulus counting means, the transition detection means and the applied decode/encode control signal for varying the modulus of the variable modulus counting means, and generating an initialize output connected to the presetting means in response to the gated inputs from the transition detection means and the applied decode/encode control signal; and
   presetting means having an input connected to receive the initialize signal as generated by the decoding-encoding means and having another input connected to receive an applied preset control signal for generating a first preset signal in response to the applied preset control signal and generating a second preset signal in response to the gated inputs from the applied preset control signal and the initialize signal from the decoding-encoding means.

3. An adaptive sampling decoding-encoding means as in claim 2 wherein said:
   variable modulus counting means includes a first counter having a preset input connected to receive a first preset input for presetting the first counter to a constant state as determined by a plurality of constant state inputs, having a control input connected to receive the modulus control signal for varying the state of the first counter, and generating a plurality of outputs representing the state of the first counter, and including a second counter having a preset input connected to receive a third preset signal for presetting the second counter to a variable state as determined by a plurality of state inputs connected to the outputs of the first counter, having another input connected to receive an applied clock signal for sequentially changing the state of the second counter, and generating an output in response to the occurrence of a predetermined state of the second counter, which output of the second counter supplants the output of the variable modulus counting means; and presetting means includes an additional input connected to receive the output of the second counter and generates a third preset signal in response to the gated inputs from the applied preset control signal, the initialize signal from the decoding-encoding means and the output signal from the second counter.

4. An adaptive sampling decoding-encoding means as in claim 2 wherein said:

variable modulus counting means includes a control input connected to receive a decrement modulus signal and another control input connected to receive an increment modulus signal for respectively decrementing and incrementing the modulus of the variable modulus counting means; and decoding-encoding means includes a decrement modulus control output for generating a decrement modulus signal when the transition detection means senses a signal level transition in conjunction with a state of the constant modulus counting means which occurs prior to the center of the sampling interval during a decode, and an increment modulus control output for generating an increment modulus signal when the transition detection means senses a signal level transition in conjunction with a state of the constant modulus counting means which occurs after the center of the sampling interval during a decode.

5. An adaptive sampling decoding-encoding means as in claim 2 wherein said:

variable modulus counting means includes a unary modulus decrement and unary modulus increment capability for decrementing the modulus of the variable modulus counting means by one state upon receiving a decrement modulus signal and incrementing the modulus of the variable modulus counting means by one state upon receiving an increment modulus signal.

6. An adaptive sampling decoding-encoding means as in claim 2 wherein said:

variable modulus counting means includes a unary state sequencing capability for sequentially changing the state of the variable modulus counting means by one state on receiving an applied clock signal.

7. An adaptive sampling decoding-encoding means as in claim 2 wherein said:

variable modulus counting means includes a carry output for generating a carry signal in response to the occurrence of the counter overflow state, which carry output supplants the output generated in response to the occurrence of a predetermined counter state.

8. Method of adaptively sampling an applied signal comprising the steps of:

sampling the applied signal at controllable intervals for producing a sampled data output in response to sensing a signal level transition in the applied signal during the sampling interval;

determining whether a previous applied signal occurred in a first portion of the sampling interval or in a second portion thereof following the first portion; and altering the occurrence of a subsequent interval by delaying the occurrence of a subsequent interval in response to a previous applied signal occurring in the second portion of the sampling interval, or by advancing the occurrence of a subsequent interval in response to a previous applied signal occurring in the first portion of the sampling interval.

* * * * *